US000001250H

United States Statutory Invention Registration [19]

[11] Reg. Number: H1250

Gilmore et al.

[43] Published: Nov. 2, 1993

[54] MODIFICATION OF ASPHALT

[75] Inventors: Dennis W. Gilmore, Katy, Tex.; Anne R. Spell, Lisle, Ill.; Richard Gelles, Houston, Tex.; James H. Collins, Houston, Tex.; Mark A. Berggren, Houston, Tex.; Mark G. Bouldin, Houston, Tex.

[73] Assignee: Shell Oil Company, Houston, Tex.

[21] Appl. No.: 909,510

[22] Filed: Jul. 6, 1992

[51] Int. Cl.[5] ..... C08L 95/00

[52] U.S. Cl. ..... 524/68; 524/70

[58] Field of Search ..... 524/68, 70, 71

[56] References Cited

U.S. PATENT DOCUMENTS

| | | | |
|---|---|---|---|
| 3,459,695 | 8/1969 | Hedge et al. | 260/28.5 |
| 3,978,014 | 8/1978 | van Beem et al. | 260/28.5 |
| 4,282,127 | 8/1981 | Desgouilles | 260/28.5 |
| 4,368,228 | 1/1983 | Gorgati | 428/110 |
| 4,490,493 | 12/1984 | Mikols | 524/68 |
| 4,891,272 | 1/1990 | Ciaccia | 428/489 |

FOREIGN PATENT DOCUMENTS

| | | |
|---|---|---|
| 0280357 | 8/1988 | European Pat. Off. . |
| 0329836 | 8/1989 | European Pat. Off. . |

*Primary Examiner*—Robert L. Stoll
*Assistant Examiner*—Joseph D. Anthony

[57] ABSTRACT

A bituminous composition comprising: (a) a bitumen, (b) a block copolymer of at least one conjugated diolefin and at least one vinyl aromatic hydrocarbon, and (c) a thermoplastic or low crystallinity polymer.

3 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

MODIFICATION OF ASPHALT

BACKGROUND OF THE INVENTION

This invention relates to the modification of asphalt with block copolymers of conjugated dienes and vinyl aromatic hydrocarbons and thermoplastic and low crystallinity polymers. More particularly, the present invention relates to the modification of asphalt with blends of such block copolymers and thermoplastic polymers such as polypropylene and ethylene vinyl acetate or blends of hydrogenated block copolymers and low crystallinity polymers such as atactic polypropylene. By low crystallinity, we mean polymers with less than 40% crystallinity.

While bitumens alone have a satisfactory flow resistance, in contrast, they have poor flexural properties in the cold and, on the other hand, particularly in the cold, they exhibit low ultimate tensile elongation values. The industry has blended various polymers with bitumens to improve these properties. Thermoplastic polymers such as ethylene vinyl acetate have been blended with bitumen. Thermoplastic elastomers such as styrene-butadiene-styrene block copolymers have also been blended with bitumen. Also, amorphous polymers such as atactic polypropylene have been blended with bitumen. These materials improve some of the properties of the asphalt but other properties need improvement.

Asphalt, or bitumen, is commonly used for roofing materials and for paving applications. Blends of bitumen and elastomeric block copolymers have excellent elasticity, flexibility and adhesion properties which render them especially suitable for use in roofing coatings and paving applications such as joint sealants and hot mix asphalt concrete. However, their resistance to flow is not always wholly satisfactory.

Furthermore, in the application of polymer-modified asphalt for rollroofing there is a need for elastomeric products which can be torch applied without worrying about polymer degradation. This suggests that polymer which contain little or no unsaturation be used. Currently, rollroofing products are manufactured with either atactic polypropylene (not elastic) or unhydrogenerated block copolymers (requires careful torching practices).

Thus, there is a need to find a way to improve the high temperature flow resistance of bitumen compositions without hurting the low temperature properties and keeping basically the same elasticity and dispersibility in the bitumen. This problem can be solved by utilizing the bituminous composition of the present invention. Many of the performance disadvantages which exist for asphalt/atactic polypropylene blends relative to asphalt unhydrogenated block copolymer blends are overcome by using the hydrogenated block copolymer-/atactic polypropylene/asphalt blends of the present invention. Furthermore, the hydrogenated block copolymer/atactic polypropylene/asphalt blends of the present invention are easily torched and elastomeric.

SUMMARY OF THE INVENTION

The present invention relates to a bituminous composition which comprises a bitumen, which can be asphalt, a block copolymer of at least one conjugated diolefin and at least one vinyl aromatic hydrocarbon and a thermoplastic or low crystallinity polymer. When the thermoplastic polymer is used, it is preferred that it be used in an amount about 0.1 to 15% of the total composition and that the block copolymer be used in an amount of less than 4% but at least 0.1% of the weight of the total composition. The preferred thermoplastic polymers are polyolefins and ethylene vinyl acetate. When a low crystallinity polymer is used, it is preferred that it be used in an amount from 0.1 to less than 20%w. The preferred low crystallinity polymer is atactic polypropylene.

DETAILED DESCRIPTION OF THE INVENTION

The bituminous component in the bituminous-block copolymer compositions according to the present invention may be a naturally occurring bitumen or derived from a mineral oil. Also petroleum derivatives obtained by a cracking process and cold tar can be used as the bituminous component as well as blends of various bituminous materials.

Examples of suitable components include distillation or "straight-run bitumens", precipitation bitumens, e.g. propane bitumens, blown bitumens and mixtures thereof. Other suitable bituminous components include mixtures of one or more of these bitumens with extenders such as petroleum extracts, e.g. aromatic extracts, distillates or residues.

The block copolymer components of the compositions of the present invention are block copolymers of at least one conjugated diene and at least one monoalkenyl aromatic hydrocarbon. The preferred conjugated dienes are butadiene and isoprene and the preferred monoalkenyl aromatic hydrocarbon is styrene. Such elastomeric block copolymers can have a general formula A-B-A or $(A\text{-}B)_nX$ wherein each A block is a monoalkenyl aromatic hydrocarbon polymer block, each B block is a conjugated diolefin polymer block, X is a coupling agent and n is an integer from 2–30. Such block copolymers may be linear or may have a radial or star configuration as well as being tapered. Block copolymers such as these are well known and are described in many patents, including U.S. Pat. Nos. 4,145,298, 4,238,202, Re. 27,145, and U.S. Pat. No. 5,039,755, which describe hydrogenated block copolymers containing butadiene. These patents are herein incorporated by reference. The description of the type of polymers, the method of manufacturing the polymers and the method of hydrogenation of the polymers is described therein and is applicable to the production of block copolymers containing other vinyl aromatic hydrocarbons and other conjugated dienes such as isoprene or mixtures of conjugated diolefins.

The molecular weights of these block copolymers may vary over a wide range. However, it is preferable that the contour arm molecular weight of the block copolymers range from 30,000 to 300,000. At lower molecular weights, they must be added at high concentrations and at higher molecular weights, they are expensive and give compositions that are difficult to process. These molecular weights are the peak molecular weights (of the dominant species) determined by gel permeation chromatography.

The molecular weight ranges referred to herein are the contour arm molecular weights. Radial and star polymers have much higher total molecular weight than linear polymers do but the mechanical properties considered herein are dependent not upon the total molecular weight in the case of radial and star polymers but rather on the molecular weight of the contour arms of those polymers. For a linear A-B-A polymer, the contour arm molecular weight is the same as the total molecular weight and the molecular weight range of the present invention is 30,000 to 300,000 for linear polymers. For three arm radial polymers, one must multiply the contour arm molecular weight by 1.5 to obtain the total molecular weight. Thus, the total molecular weight range for a three arm polymer of the present invention would be 45,000 to 450,000. For a four arm radial polymer, the range would be two times the contour molecular weight range or 60,000 to 600,000. In general, for a coupled radial or star polymer $(AB)_nX$, the contour arm molecular weight is the molecular weight along the contour arm of the molecule, which is $(AB)_2$. Thus, for a coupled radial or star $(AB)_nX$, the total molecular weight range is (n/2) times the contour arm molecular weight range.

A wide variety of thermoplastic polymers may be used in the blends of the present invention. Such polymers include ethylene polymers such as ethylene vinyl acetate (EVA), styrenic polymers like styrenebutadiene rubber, polyolefins such as polyethylene (PE) and polypropylene (PP), blends of PE/PP, PE/EVA, PP/EVA and PP/PE/EVA, and mixtures of recycled plastics of the above (which may contain other plastics), and those which are described in U.S. Pat. No. 3,978,014 which is herein incorporated by reference, etc. The preferred thermoplastic polymers to be used herein are ethylene vinyl acetate and polyethylene (virgin or recycled) because these products are capable of improving the temperature performance of asphalt. When the thermoplastic polymer is used in the blend of the present invention, it is preferred that it be used in an amount from 0.1 to 15% of the total bituminous composition because these thermoplastic polymers can improve the high temperature flow resistance of the bitumen by increasing stiffness and viscosity while doing little to hurt the low temperature properties and elasticity. If more than 15% is used, the thermoplastic polymer/asphalt blend is unprocessable with conventional equipment. The block copolymer in this situation should be used in an amount less than 4% but at least 0.1% of the total bituminous composition because in this range the formation of a polymeric "network", where a continuous portion of block copolymer-modified asphalt exists, is possible. We prefer 3 to 4% w.

Low crystallinity polymers having less than 40% crystallinity such as atactic polypropylene, ethylene-propylene copolymers, ethylene-propylene rubber, ethylene-propylene-diene rubber, linear low density polyethylene, ultra low density polyethylene and ethylene acrylic and methacrylic acid copolymers can be used to advantage in the present invention. The preferred low crystallinity amorphous polymer is atactic polypropylene. When these polymers are used, it is preferred that they be used in an amount from 0.1 to less than 20% by weight and that the block copolymer be used in amount from 0.1 to 8%w. In general, one wants to add enough block copolymer so that the blend is elastomeric and enough of both polymers to obtain good flow resistance.

The compositions of the present invention may contain other materials such as fillers including calcium carbonate, limestone, chalk, ground rubber tires, etc. If other materials are added, the relative amounts of the bitumen and the polymers specified above remain the same.

The bituminous block copolymer compositions of the present invention may be prepared by various methods. A convenient methods comprises blending of the components at an elevated temperature, preferably not more than about 250° C. to keep the asphalt heating costs down. Other methods for preparing the composition of the present invention include precipitation or drying of the components from a common solvent and emulsifying the polymer with an asphalt emulsion.

EXAMPLES

Several different blends of asphalt and polymeric materials were made and their properties were compared. These blends were simply made by blending the materials together in a laboratory high shear mixer at a temperature of about 200°-220° C.

The materials used include Type III asphalt which is a blown asphalt from GAF Corporation. WR AC-10 is an asphalt grade made by Shell Oil Company at its Wood River Refinery. POLYTAC R-500 polymer is an atactic polypropylene from Crowley Chemical Company. D1101 is KRATON® D1101 rubber, a linear styrene-butadiene-styrene unhydrogenated block copolymer made by Shell Oil Company having a molecular weight of 111,000. The SEBS is a hydrogenated styrene-butadiene-styrene block copolymer having a molecular weight of 170,000.

The blends were tested for the various physical properties as described in the table below:

| PROPERTY | TYPE III ASPHALT | 12% D1101 88% WR AC-10 | 30% POLYTAC R-500 70% WR AC-10 | 6% SEBS 15% POLYTAC R-500 79% WR AC-10 |
|---|---|---|---|---|
| Soft. Pt. | 199° F. | 227° F. | 221° F. | 233° F. |
| Vertical Flow, Pass | 194° F. | <194° F. | 203° F. | 221° F. |
| Tensile Str. | 73 PSI | 133 PSI | 28 PSI | 136 PSI |
| Tensile Elong. | 11% | 1982% | 21% | 1762% |
| Cold Temp. Flex, Pass | 39° F. | −31° F. | 3° F. | 7° F. |
| Fatigue Life, Cycles to Fail | 50 | >10,000 | <1000 | >10,000 |

The data in the above table show that relative to asphalt/atactic polypropylene blends, the blends of the present invention, represented by the column at the far right of the table, exhibit improved polymer dispersion in the asphalt, much higher tensile strength and tensile elongation, improved high temperature flow resistance and significantly increased fatigue life. The fatigue life and elongation improvement is particularly noteworthy because it places blends of the present invention on a par with asphalt/unhydrogenated styrene-butadiene-styrene block copolymer blends (second column) and therefore eliminates the major performance distinction between SBS modified and atactic polypropylene modified rolled roofing membranes.

Similar experiments were performed using KRATON® G1650 rubber, a commercially available linear hydrogenated styrene-butadiene-styrene block copolymer (MW 67,000), KRATON® G1651 rubber, a hydrogenated styrene-butadiene-styrene block copolymer (MW 181,000) and KRATON® G1654 rubber, a hydrogenated styrene-butadiene-styrene block copolymer (MW 110,000). The same general improvements were observed when these polymers were used in place of the SEBS polymer described above. Similar experiments were also performed using linear low density (low crystallinity) polyethylene and atactic propylene/ethylene copolymers. The same general improvements were observed when these two polymers were used in place of atactic polypropylene.

Furthermore, blends of the present invention contain only polymer with low or no main chain unsaturation. These blends can be used to make rollroofing which is both elastomeric and easily torched. "Easily torched" refers to the ability of a product to not be easily degraded by torching. Such a product does not require careful torching practices.

We claim:

1. A bituminous composition comprising:
(a) a bitumen,
(b) at least 0.1 but less than 4 wt % of a block copolymer of at least one conjugated diolefin and at least one vinyl aromatic hydrocarbon, and
(c) from 0.1 to 15 wt % of a thermoplastic polymer.

2. A bituminous composition comprising:
(a) a bitumen,
(b) from 0.1 to 8 wt % of a block copolymer of at least one conjugated diolefin and at least one vinyl aromatic hydrocarbon, and
(c from 0.1 to less than 20 wt % of a low crystallinity polymer which contains less than 40% crystallinity.

3. The composition of claim 2 wherein the low crystallinity polymer is atactic polypropylene and the block copolymer is a hydrogenated styrene-butadiene-styrene block copolymer.

* * * * *